US012549432B1

(12) United States Patent
Rajendran

(10) Patent No.: US 12,549,432 B1
(45) Date of Patent: Feb. 10, 2026

(54) DYNAMIC IDENTIFICATION OF USER EQUIPMENT (UE) EXPERIENCING PERFORMANCE ISSUES WITHIN A 5G RADIO ACCESS NETWORK

(71) Applicant: Boost SubscriberCo L.L.C., Englewood, CO (US)

(72) Inventor: Karupaiah Rajendran, Highlands Ranch, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 0 days.

(21) Appl. No.: 18/800,724

(22) Filed: Aug. 12, 2024

(51) Int. Cl.
*H04L 41/0631* (2022.01)
*H04L 41/0659* (2022.01)
*H04W 28/04* (2009.01)

(52) U.S. Cl.
CPC ...... *H04L 41/0645* (2013.01); *H04L 41/0659* (2013.01); *H04W 28/04* (2013.01)

(58) Field of Classification Search
CPC . H04L 41/0645; H04L 41/0659; H04W 28/04
See application file for complete search history.

(56) References Cited

U.S. PATENT DOCUMENTS

| 10,555,191 | B1 | 2/2020 | Jat et al. |
| 11,477,827 | B2 | 10/2022 | Kojukhov et al. |
| 2022/0224616 | A1 | 7/2022 | Andress et al. |
| 2022/0312399 | A1* | 9/2022 | Pezeshki ............... H04W 48/02 |
| 2023/0370892 | A1 | 11/2023 | Ramaswamy et al. |
| 2024/0048978 | A1 | 2/2024 | McTiernan et al. |
| 2024/0056842 | A1 | 2/2024 | Masood et al. |
| 2024/0073726 | A1* | 2/2024 | Uniyal .................. H04W 24/10 |
| 2024/0171452 | A1 | 5/2024 | Horemuz et al. |
| 2024/0259889 | A1* | 8/2024 | Nishimaki ...... H04W 36/00837 |
| 2024/0314598 | A1 | 9/2024 | Iskander et al. |
| 2025/0142432 | A1* | 5/2025 | Ali .................... H04W 36/0005 |

* cited by examiner

*Primary Examiner* — Clayton R Williams
(74) *Attorney, Agent, or Firm* — Fish & Richardson P.C.

(57) ABSTRACT

A method includes receiving, at a radio access network (RAN) intelligent controller (RIC), a first set of network performance data from one or more network components within a radio access network (RAN), identifying based on the first set of network performance data, that at least one performance indicator associated with the plurality of operation measurement counters fails to satisfy a corresponding threshold condition, identifying a plurality of user equipment devices as candidate sources of a root cause for the at least one performance indicator failing to satisfy the corresponding threshold condition, receiving, at the RIC, a second set of performance data, identifying one or more user equipment devices, among the plurality of user equipment devices identified as candidate sources of the root cause, likely to cause the at least one performance indicator to fail to satisfy the corresponding threshold condition, and generating a signal configured to trigger a remedial action.

15 Claims, 6 Drawing Sheets

DYNAMIC IDENTIFICATION OF USER EQUIPMENT (UE) EXPERIENCING PERFORMANCE ISSUES WITHIN A 5G RADIO ACCESS NETWORK

TECHNICAL FIELD

The present disclosure relates to a wireless communication system, and more particularly, relates to technology for dynamically identifying and resolving user-equipment experiencing performance issues within a radio access network (RAN).

BACKGROUND

A wireless network provides voice and data services to a user equipment (UE) in geographical areas covered by the network. For example, the UE can transmit and receive data in the covered areas using a base station (BS) of the network or a partner network within the covered areas.

SUMMARY

In some aspects, the subject matter described in this specification is embodied in methods that include the actions of receiving, at a radio access network (RAN) intelligent controller controller (RIC), a first set of network performance data from one or more network components within a radio access network (RAN), the first set of network performance data representing non-real-time data obtained from a plurality of operation measurement counters associated with the one or more network components, identifying, by one or more processing devices, based on the first set of network performance data, that at least one performance indicator associated with the plurality of operation measurement counters fails to satisfy a corresponding threshold condition, responsive to identifying that the at least one performance indicator fails to satisfy a corresponding threshold condition, identifying a plurality of user equipment devices as candidate sources of a root cause for the at least one performance indicator failing to satisfy the corresponding threshold condition, receiving, at the RIC, a second set of performance data, the second set of performance data representing near real-time data obtained from the plurality of user equipment devices identified as candidate sources of the root cause for the at least one performance indicator failing to satisfy the corresponding threshold condition, identifying, by the one or more processing devices, one or more user equipment devices, among the plurality of user equipment devices identified as candidate sources of the root cause, likely to cause the at least one performance indicator to fail to satisfy the corresponding threshold condition, and based on identifying one or more user equipment devices likely to cause the at least one performance indicator to fail to satisfy the corresponding threshold condition, generating, by one or more processing devices, a signal configured to trigger a remedial action.

In some implementations, the actions may include generating, by the one or more processing devices, a signal configured to trigger a remedial action including, generating a signal to a user equipment device instructing the user equipment device to reduce a number of multiple input multiple output (MIMO) layers utilized to cause a reduction in heat levels produced from a battery of the user equipment device.

In some implementations, the actions may include generating, by the one or more processing devices, a signal configured to trigger a remedial action including, generating a signal to the plurality of candidate user equipment devices to change a trigger value for at least one user equipment device in the subset of user equipment devices.

In some implementations, the actions may include generating, by the one or more processing devices, a signal configured to trigger a remedial action including, generating a signal to the plurality of candidate user equipment to change a hand over value for at least one user equipment device in the subset of user equipment devices.

In some implementations, the actions may include generating, by the one or more processing devices, a signal configured to trigger a remedial action including, identifying a sector of the RAN that does not have current performance issues, and generating a signal instructing at least one user equipment device move to the sector of the RAN that does not have performance issues.

In some implementations, the first set of performance data is processed by a non-real-time RIC, and the second set of performance data is processed by a near real-time RIC.

In some implementations, the actions include, receiving, at a radio access network (RAN) intelligent controller (RIC), a first set of network performance data from one or more network components within a radio access network (RAN), the first set of network performance data representing non-real-time data obtained from a plurality of operation measurement counters associated with the one or more network components, comprises receiving random access channel related counter data, past and current month user subscription comparison data, uplink received signal strength indicator statistics, and resource block assignments data.

In another general aspect, a system is provided. The system includes The system includes one or more computers and one or more storage devices on which are stored instructions that are operable when executed by the one or more computers, to cause the one or more computers to perform operations including receiving, at radio access network (RAN) intelligent controller (RIC), a first set of network performance data from one or more network components within a radio access network (RAN), the first set of network performance data representing non-real-time data obtained from a plurality of operation measurement counters associated with the one or more network components, identifying, by one or more processing devices, based on the first set of network performance data, that at least one performance indicator associated with the plurality of operation measurement counters fails to satisfy a corresponding threshold condition, responsive to identifying that the at least one performance indicator fails to satisfy a corresponding threshold condition, identifying a plurality of user equipment devices as candidate sources of a root cause for the at least one performance indicator failing to satisfy the corresponding threshold condition, receiving, at the RIC, a second set of performance data, the second set of performance data representing near real-time data obtained from the plurality of user equipment devices identified as candidate sources of the root cause for the at least one performance indicator failing to satisfy the corresponding threshold condition, identifying, by the one or more processing devices, one or more user equipment devices, among the plurality of user equipment devices identified as candidate sources of the root cause, likely to cause the at least one performance indicator to fail to satisfy the corresponding threshold condition, and based on identifying one or more user equipment devices likely to cause the at least one performance indicator to fail to satisfy the corresponding threshold condition, generating, by one or more processing devices, a signal configured to trigger a remedial action.

Implementations of the system can include one or more of the following features. In some implementations, the actions may include generating, by the one or more processing devices, a signal configured to trigger a remedial action comprises, generating a signal to a user equipment device instructing the user equipment device to reduce a number of multiple input multiple output (MIMO) layers utilized to cause a reduction in heat levels produced from a battery of the user equipment device.

In some implementations, the actions may include generating, by the one or more processing devices, a signal configured to trigger a remedial action including, generating a signal to the plurality of candidate user equipment devices to change a trigger value for at least one user equipment device in the subset of user equipment devices.

In some implementations, the actions may include generating, by the one or more processing devices, a signal configured to trigger a remedial action including, generating a signal to the plurality of candidate user equipment to change a hand over value for at least one user equipment device in the subset of user equipment devices.

In some implementations, the actions may include generating, by the one or more processing devices, a signal configured to trigger a remedial action including identifying a sector of the RAN that does not have current performance issues, and generating a signal instructing at least one user equipment device move to the sector of the RAN that does not have performance issues.

In some implementations, the first set of performance data is processed by a non-real-time RIC, and the second set of performance data is processed by a near real-time RIC.

In some implementations, the actions include receiving, at a radio access network (RAN) intelligent controller (RIC), a first set of network performance data from one or more network components within a radio access network (RAN), the first set of network performance data representing non-real-time data obtained from a plurality of operation measurement counters associated with the one or more network components, comprises receiving random access channel related counter data, past and current month user subscription comparison data, uplink received signal strength indicator statistics, and resource block assignments data.

In another general aspect, a non-transitory computer readable medium is provided. The non-transitory computer readable medium stores instructions that are executable by a processing device, and upon such execution cause the processing device to perform operations. The operations include receiving, at a radio access network (RAN) intelligent controller (RIC), a first set of network performance data from one or more network components within a radio access network (RAN), the first set of network performance data representing non-real-time data obtained from a plurality of operation measurement counters associated with the one or more network components, identifying, by one or more processing devices, based on the first set of network performance data, that at least one performance indicator associated with the plurality of operation measurement counters fails to satisfy a corresponding threshold condition, responsive to identifying that the at least one performance indicator fails to satisfy a corresponding threshold condition, identifying a plurality of user equipment devices as candidate sources of a root cause for the at least one performance indicator failing to satisfy the corresponding threshold condition, receiving, at the RIC, a second set of performance data, the second set of performance data representing near real-time data obtained from the plurality of user equipment devices identified as candidate sources of the root cause for the at least one performance indicator failing to satisfy the corresponding threshold condition, identifying, by the one or more processing devices, one or more user equipment devices, among the plurality of user equipment devices identified as candidate sources of the root cause, likely to cause the at least one performance indicator to fail to satisfy the corresponding threshold condition, and based on identifying one or more user equipment devices likely to cause the at least one performance indicator to fail to satisfy the corresponding threshold condition, generating, by one or more processing devices, a signal configured to trigger a remedial action.

Other features and advantages of the description will become apparent from the following description, and from the claims. Unless otherwise defined, the technical and scientific terms used herein have the same meaning as commonly understood by one of ordinary skill in the art to which this invention belongs.

BRIEF DESCRIPTION OF THE DRAWINGS

Like reference numbers and designations in the various drawings indicate like elements.

DETAILED DESCRIPTION

Figure 1A:
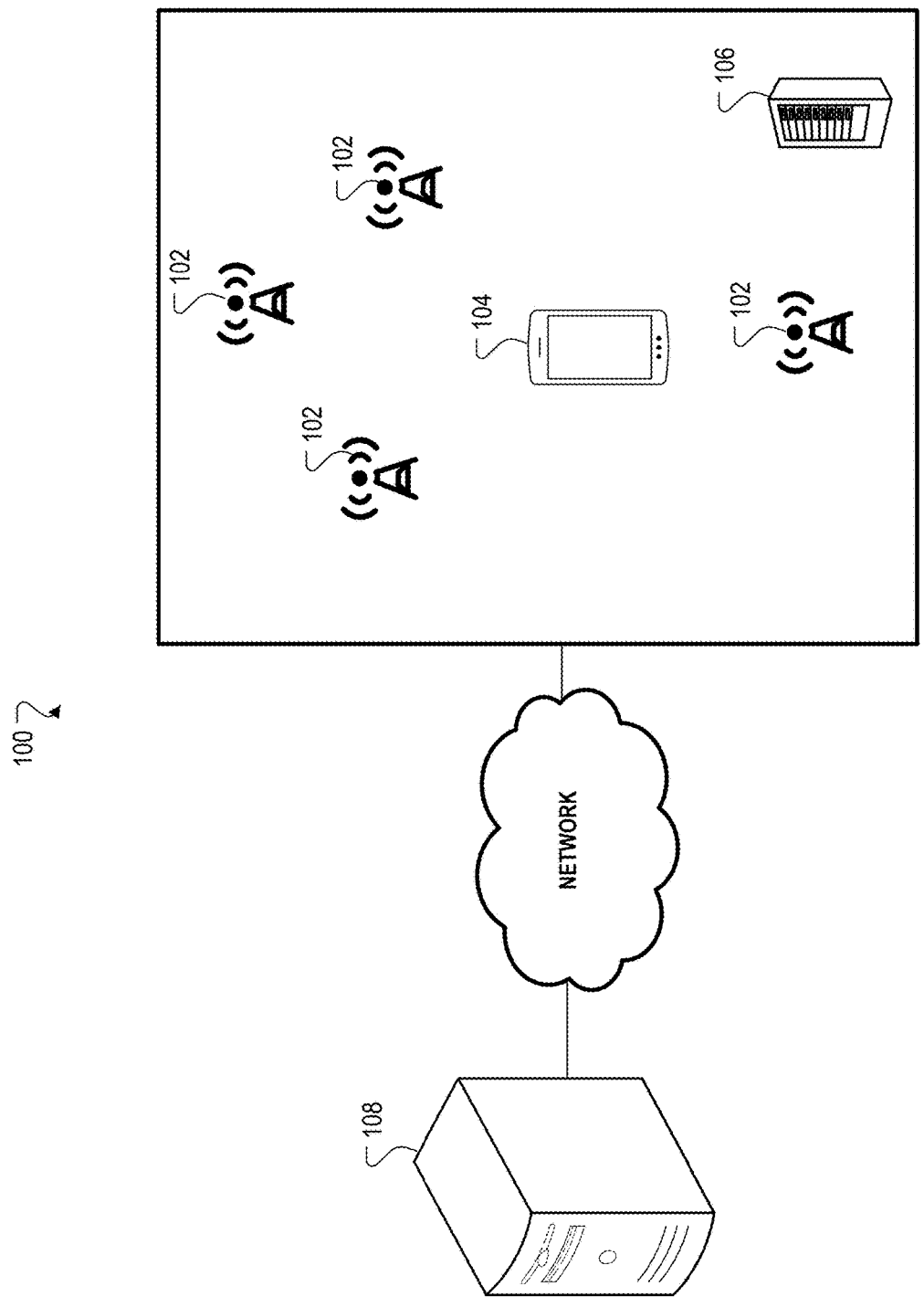
FIG. 1A is an example of a portion of a radio access network (RAN).

Occasionally, customers utilizing a wireless cellular network may experience different issues with their network service, for example, customers may experience a dropped voice call, or problems while downloading or uploading information from a website, slow connectivity, etc. These performance issues may be caused by technical issues at the UE or on the network-side, or both. Service providers typically determine the root-cause of customer issues, and ultimately determine the steps that may be taken at the network-side or on the UE to rectify the customer issues. Currently, customers that experience performance issues typically contact customer service to notify the service provider of the issues. The service provider then attempts to determine the cause of the issue based on the information received from the customer, for example, via a troubleshooting process, potentially while on a call with the customer. This process may be time-consuming and frustrating for the customer, and may often need to be escalated for later resolution.

The technology described herein facilitates a process in which various performance parameters associated with UEs and the network are monitored, and root-causes of performance issues are identified and resolved dynamically, potentially on a preemptive basis and without input from the customer. In some implementations, this can allow for fast and efficient (and potentially preemptive) resolution of performance issues-whether caused at the UE or at the network side-leading to not only satisfactory customer experience, but also low network outage and dropped calls, thereby optimizing use of network resources.

In some implementations, the service provider may receive network performance parameters from the different components within the network, and analyze the performance parameters to determine whether any of the components with the network are performing below performance thresholds. When a determination is made that certain performance thresholds are not being met, one or more changes may be automatically initiated to optimize the network performance. As described herein, proactively monitoring network performance data and dynamically optimizing network performance helps to limit the number of performance issues related to UEs and network components and increases the speed at which performance issues are resolved.

This document describes technology for automatically identifying a performance issue, determining a cause of the performance issue, and dynamically resolving said issue. The performance issue is identified and resolved without requiring any input from the customer experiencing the issue. Resolving the performance issue in a proactive way allows the issue to be resolved in a time efficient manner, and in many cases, without additional participation by the customer.

In some implementations, the techniques described herein utilize a cloud application, which is an application that is executed on a cloud platform, and in communication with an application server, which is a server that monitors various performance metrics within the RAN, to determine the cause of an issue. When the customer experiences a performance issue, for example, the customer has a dropped voice call, a user equipment application that is deployed on the UE, communicates performance data to the cloud application. The performance data associated with the UE represents different function parameters of the UE. The performance data is stored in a buffer and is refreshed periodically. When the issue is detected, the performance data collected from the time the issue was detected and the performance data collected during a period of time before the issue was detected, is moved from the buffer to a more permanent second storage location for analysis. In some cases, the performance data collected for a period of time after the detection of the issue is moved from the buffer to a more permanent storage location to be analyzed.

In some implementations, the user equipment application communicates the stored performance data to the cloud application. The cloud application is in communication with the one or more components of the network. For example, the cloud application receives data from one or more distributed units (DU) located throughout the network. The cloud application may also receive data from a centralized unit (CU), and a radio unit (RU) which are each connected to the DU through an open interface. The cloud application is configured to determine whether the cause of the customer issue was due to a network problem or a customer device problem. The cloud application may use the performance data received from the UE, as well as network data received from the one or more components within the wireless network to identify the cause of the customer issue.

In some implementations, if the cloud application determines that the UE is the cause of the performance issue, the cloud application may communicate with the UE application to cause the application to adjust settings on the UE to rectify the issue. In some implementations, if the cloud application determines that a problem on the network caused the performance issue, the cloud application may then initiate one or more actions on the network side to address the issue. For example, the cloud application may identify an available roaming network, and communicate instructions to the user equipment application, the instructions configured to enable UE to switch to the available roaming network.

In some implementations, when the cloud application cannot determine the cause of the customer issue, the cloud application escalates the issue to the application server 108. For example, the cloud application communicates the performance data and the network data to the application server for the application server to perform additional processing to determine the cause of the performance issue. The application server 108 may utilize a machine learning model, which is trained to identify network and or performance issues, to identify the cause of the issues. The trained machine learning model can be trained and retrained based on the application server 108 continuously receiving performance data and network data over time. For example, a machine learning model can be trained via a supervised learning process using a large corpus of training performance and network data. When the application server identifies the cause of the performance issue as a network issue, the application server may implement changes directly to the network to rectify the network issue. When the application server identifies the cause of the performance issue as a UE specific issue, the application server may communicate to the UE application instructions to perform to rectify the issue.

This document also describes technology for dynamically identifying one or more UE that are affected by radio network coverage issues. In some implementations, the cloud application continuously receives network performance data from the one or more components within the RAN network. The network performance data may include a plurality of operation measurement counters for each of the one or more components within the RAN network. The cloud application analyzes the network performance data based on each of the one or more operation measurement counters, and identifies a performance issue when at least one of the one or more operation measurement counters are outside of a threshold value. The cloud application may determine that a subset of one or more UEs may be the cause of the identified performance issue, e.g., a subset of one or more UEs may be a root cause for at least one performance indicator failing to satisfy a corresponding threshold. Identification of the subset of UEs can be done using non-real-time data and at the non-real-time framework of a RIC. Once a subset of UEs is identified using non-real-time data, real-time (or near-real-time) performance parameters can be tracked and analyzed—for example, using near-real-time components of a RIC—to identify the one or more UEs within the subset that are likely causing the performance issues. Accordingly, the cloud application can be configured to determine, using the near-real-time RIC, an action that can be taken to rectify the performance issue. In some implementations, this can include transmitting one or more signals to the identified UEs, the signals being configured to adjust parameters at the UEs to resolve/address the underlying performance issue. In some implementations, the action can include making adjustments at the network components such that information from the identified UEs are isolated until a resolution is reached. For example, the cloud application may change the trigger values to switch the multiple input multiple output (MIMO) for the identified UEs such that data from the corresponding UEs are not considered until a resolution is reached. The trigger values to switch MIMO layers for the identified UE can be due to high block error rate while the signal-to-interference-plus-noise ratio is better, and can be related to UE battery performance or HW Component performance related to simultaneous Wi-Fi/5G operation for an instance.

The technology described in this document provides the advantage of proactively determining causes of performance issues within a wireless telecommunication network. In some implementations, the causes are identified, and subsequently automatically addressed/resolved, potentially with minimal or no input from customers. As such, the technology allows a service provider to timely and efficiently handle performance issues that may arise, for example, by continuously monitoring various performance parameters associated with the network and automatically addressing/resolving the issues. Further, by using the non-real-time and near-real-time frameworks of a RIC intelligently, the technology described herein allows for first identifying a subset of UEs in a resource-efficient manner, and then switching to near-real-time processing to identify one or more UEs within the limited subset. This two-step process allows for accurately identifying the UEs responsible for performance issues without having to perform resource intensive near-real-time processing on data from all UEs across the network.

FIG. 1A depicts an example 5G O-RAN network 100 in accordance with technology described herein. The 5G O-RAN network 100 may include one or more cell sites 102, one or more user equipment devices 104, a cloud application 106, and an application server 108. The 5G RAN network 100 may be managed by a service provider that services the one or more user equipment devices 104 within the wireless network 100. The network 100 may be configured to continuously receive performance data from the one or more cell sites 102 and the one or more user equipment devices 104 to dynamically optimize the performance of the network 100. The one or more user equipment devices 104 may be electronic devices utilized by a customer, for example, a cellphone, or an iPad, or any other suitable electronic device.

The service provider may monitor the network performance data and the performance data associated with the user equipment 102 serviced by the network 100 to proactively identify and resolve customer issues. When a customer experiences an issue, for example, a dropped video call, or connectivity which is below a threshold, performance data from the customer user equipment 104 is communicated to the cloud application 106. The cloud application 106 may be configured to receive performance data from the one or more network components including the one or more cell sites 102 within the network 100. As is described in greater detail with respect to FIG. 3 and FIG. 4 below, the cloud application 106 processes the performance data to identify the cause of the issue and to provide remedial steps to resolve the issue.

In some instances, the cloud application 106 may not be able to determine the cause of the customer issue. In these instances, the issue is escalated to the application server 108. As illustrated in FIG. 1A, the application server 108 is in communication with the one or more components of the RAN network 100. When an issue is escalated to the application server 108, the performance data from the one or more user equipment devices 104 and the one or more components within the network 100 is communicated to the application server 108. The application server 108 also receives additional data from one or more additional components within the network 100. As described in further detail below, the application server 108 utilizes a training model trained in identifying network issues based on performance data to identify the cause of the client issue. The process of the application server 108 processing large volumes of performance data to identify a cause of an issue requires more time and resources. As such, an advantage of the technology described herein, which utilizes a cloud application 106 to proactively determine the cause of a customer issue, is faster and uses less resources than relying on the application server 108 each time a customer issue is identified. The two-tier processing of identifying a customer issue makes the process more efficient by only escalating problems which are not easily identifiable to the application server 108 for processing.

In some implementations, aspects of the technology described herein are implemented using a RIC in a 5G O-RAN. Specifically, because a RIC includes frameworks for both non-real-time and near-real-time processing, the RIC provides an ideal platform for implementing portions of the technology described herein. For example, because processing near-real-time data for all UEs across the network can be prohibitively resource-intensive, first a subset of UEs likely responsible for any performance issues can be identified based on processing performance parameters using the non-real-time framework of a RIC. Once a limited subset of UEs is identified via non-real-time processing, near-real-time framework of the RIC can then be used to process near-real-time performance parameters from the UEs within the subset to accurately and efficiently identify the one or more UEs causing the performance issues. Thus, the RIC allows for implementing the technology described herein by providing an intelligent trade-off among resource usage, accuracy and identification speed.

Figure 1B:
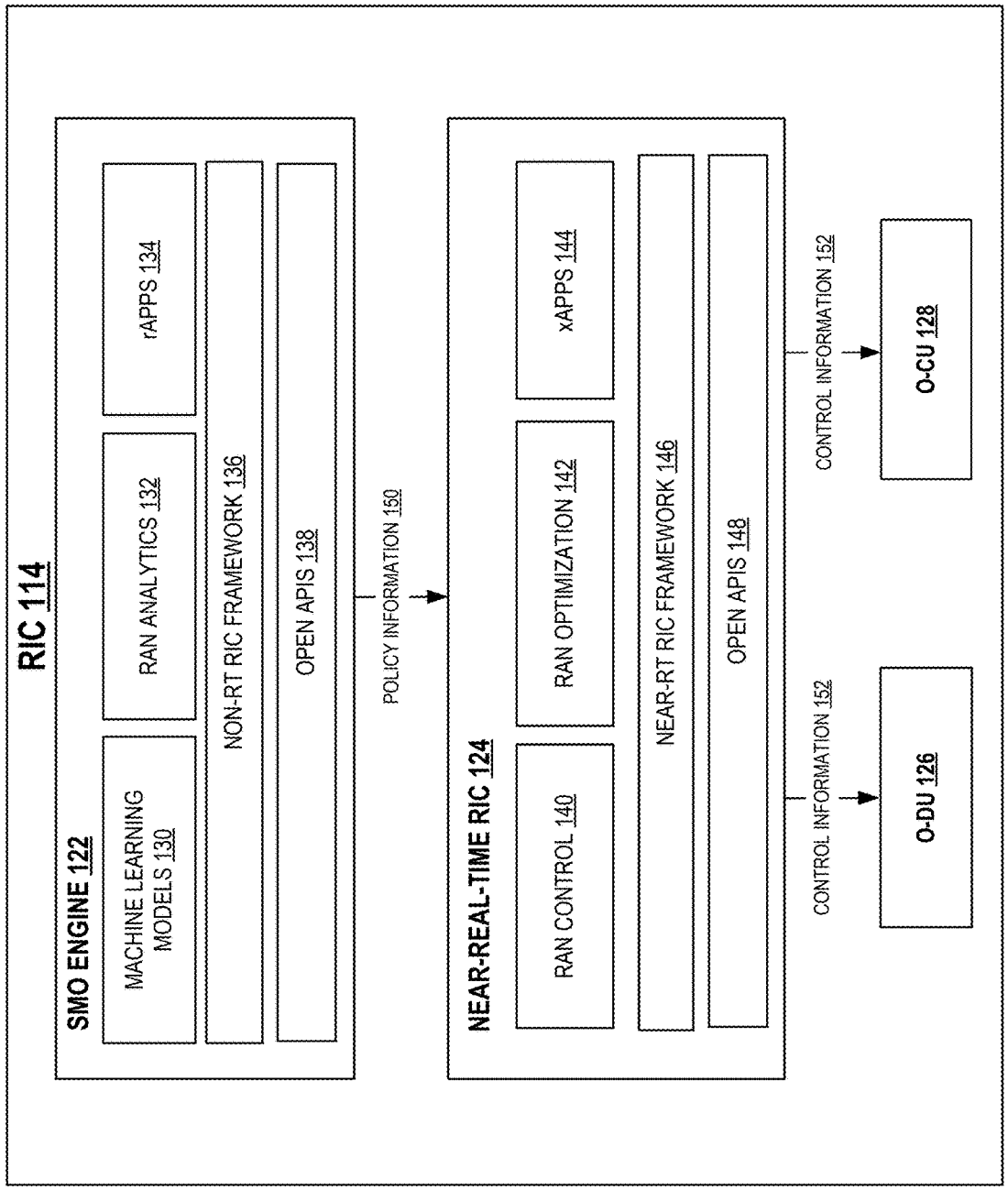
FIG. 1B is an example of a RAN intelligent controller (RIC).

FIG. 1B is a block diagram of an example RIC that executes O-RAN applications for a communication session of a 5G O-RAN network in accordance with technology described herein. The RIC 114 includes a Service Management and Orchestration (SMO) engine 122, a near real-time RIC 124, an O-RAN Distributed Unit (O-DU) 126, and an O-RAN Central Unit 128.

The RIC 114 is configured to perform non-real-time analysis and near-real-time analysis of traffic by executing performance applications in order to determine traffic quality. In particular, the RIC 114 is divided into non-real-time and near-real-time modules. The SMO engine 122 is configured to perform non-real-time analysis of traffic by executing machine learning models 130, RAN analytics 132, and/or rApps 134. The SMO engine 122 can execute the models 130, analytics 132, and rApps 134 using a non-real-time RIC framework 136 and one or more function calls (e.g., open APIs 138). The near real-time RIC 124 is configured to perform near real-time analysis of traffic during a communication session by executing RAN control 140, RAN optimization 142, or xApps 144. The SMO engine 122 can execute the RAN control 140, RAN optimization 142, and xApps 144 using a near-real-time RIC framework 146 and one or more function calls (e.g., open APIs 148).

The O-DU 126 and the O-CU 128 are configured to generate (e.g., prepare) data for transmission using the O-RAN, where the O-DU 126 is configured to prepare data for lower layer protocols and the O-CU 128 is configured to prepare data for higher layer protocols. For example, the O-DU 126 can structure data or information of physical layer protocols for the RIC 114 to provide to one or more other computing devices in the O-RAN.

The SMO engine 122 can provide policy information 150 to the near-real-time RIC 124 for performing one or more traffic control or traffic analysis operations during the communication session. The policy information 150 can include data from the RAN analytics 132 including network data, performance metrics, user data, or outputs of the models 130 generated from data of the RAN analytics 132. Based on the policy information 150, the near-real-time RIC 124 can perform RAN control 140 or RAN optimization 142, and, in some examples, the near-real-time RIC 124 can execute the xApps 144 based on the policy information 150. The near-real-time RIC 124 is configured to provide control information 152 to the O-DU 126, the O-CU 128, or both to communicate with one or more other devices of the O-RAN network. For example, the near-real-time RIC 124 can provide control information 124 including RAN optimization information 142 or outputs from execution of xApps 144 to a user device of the O-RAN network.

Figure 2:
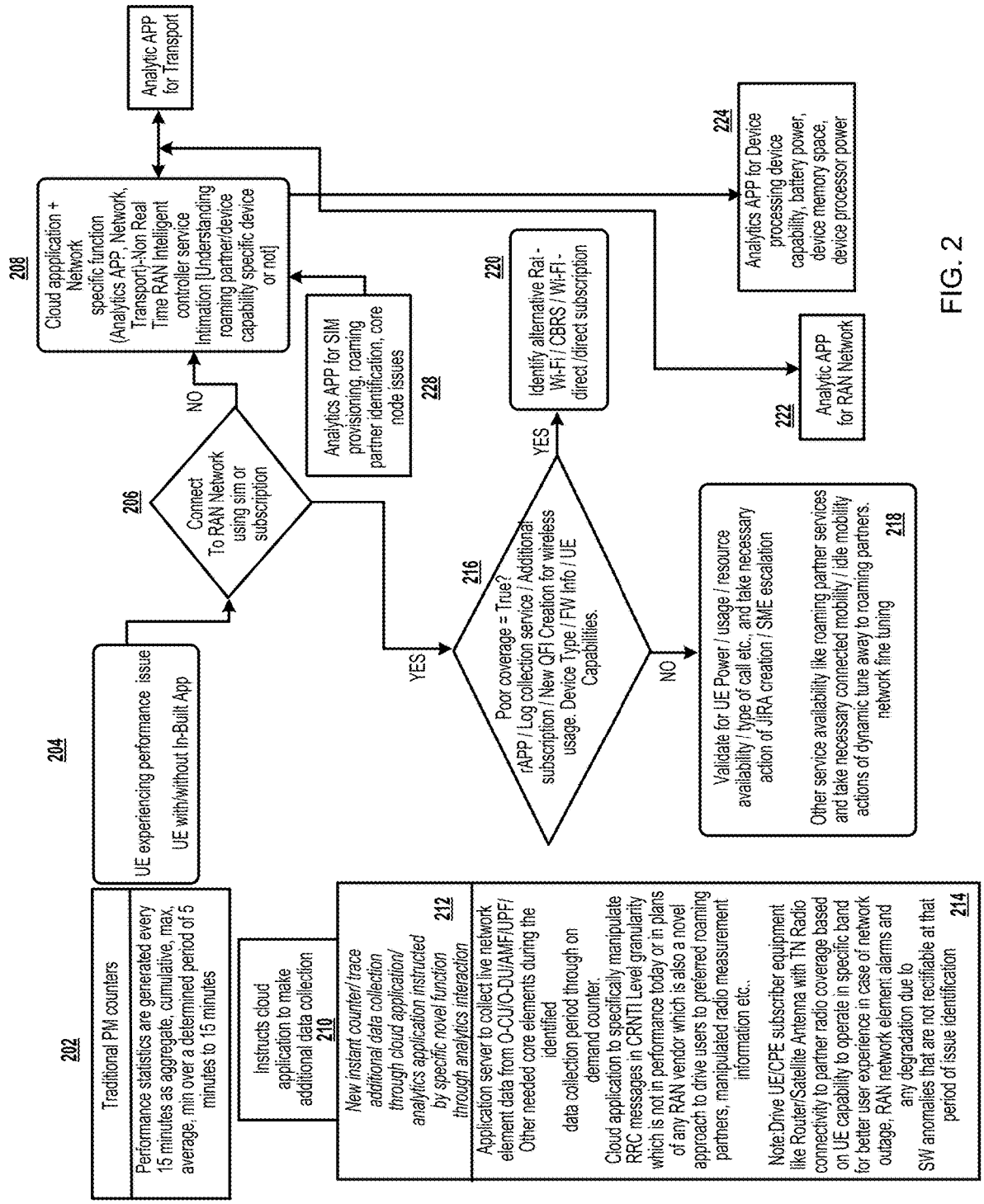
FIG. 2 is a flowchart of a process for identifying and resolving user-equipment (UE)/network issues within the RAN.

FIG. 2 is a flowchart of a process for proactively identifying and resolving performance issues within a RAN network 100. As described in more detail below with reference to FIG. 3, a UE may be equipped with user equipment application. The user equipment application may be a network specific application or a third-party application that is running on the UE. When the UE is experiencing a performance issue while connected to the network, the system is configured to proactively determine the cause of the performance issue faced by the UE, as described below in more detail below with respect to FIG. 3 and FIG. 4.

Figure 3:
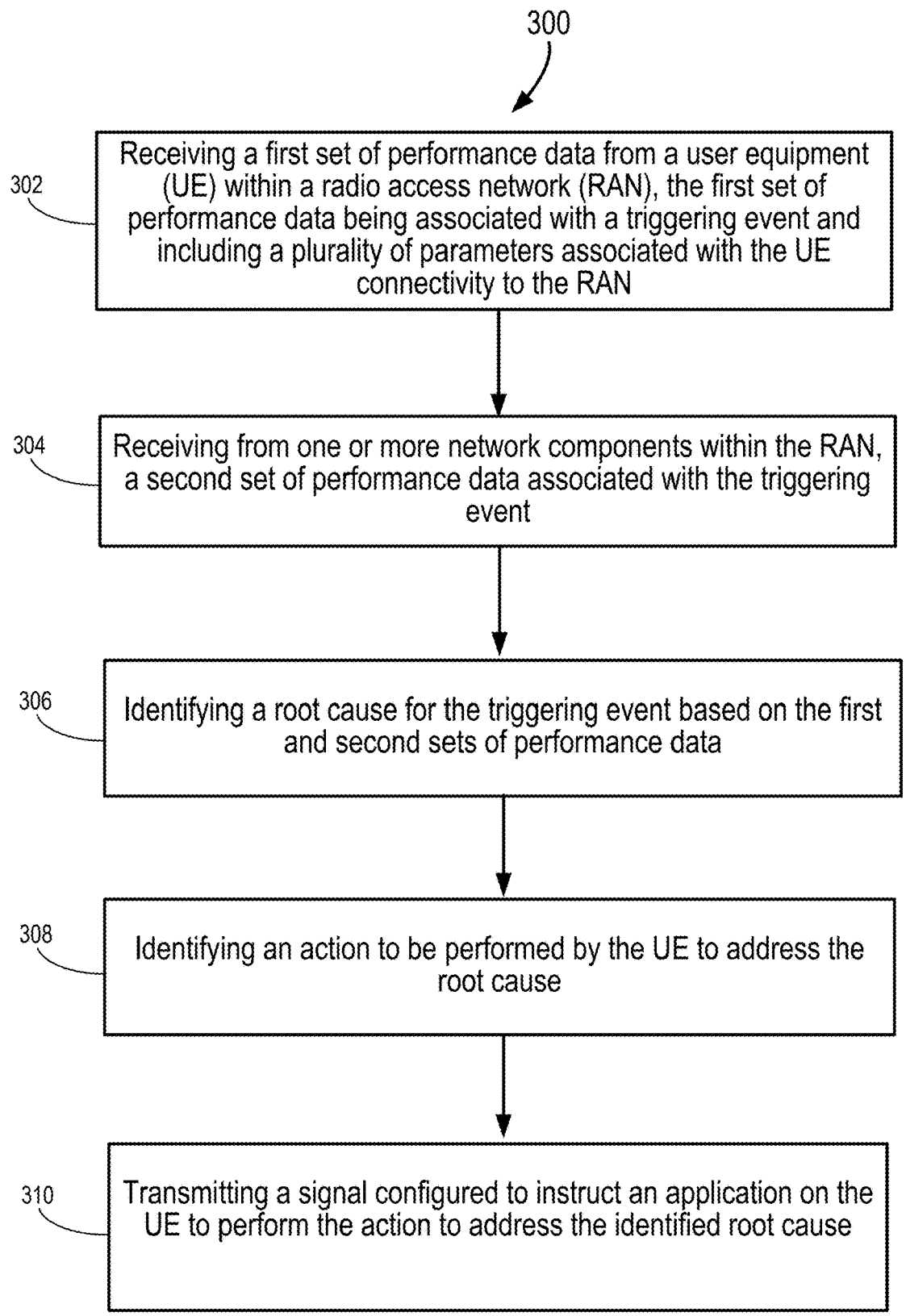
FIG. 3 is a flowchart of a process for identifying and resolving a root cause of performance issues at a user-equipment (UE).

FIG. 3 illustrates exemplary process 300 for transmitting a signal configured to instruct an application on a user equipment (UE) to perform an action to address an identified root cause. The following describes the process 300 as being performed by components of the system 100 described above with reference to FIGS. 1A and 1B. However, the process 300 may be performed by other systems and configurations. Briefly, the process 300 may include receiving, a first set of performance data from a user equipment (UE) within a radio access network (RAN), the first set of performance data being associated with a triggering event and including a plurality of parameters associated with the UE connectivity to the RAN (302), receiving from one or more network components within the RAN, a second set of performance data associated with the triggering event (304), identifying a root cause for the triggering event based on the first and second sets of performance data (306), and transmitting a signal configured to instruct an application on the UE to perform the action to address the identified root cause (308).

In more detail, process 300 may include receiving, a first set of performance data from a user equipment (UE) within a radio access network (RAN), the first set of performance data being associated with a triggering event and including a plurality of parameters associated with the UE connectivity to the RAN (302). For example, this may correspond to one or more processing devices of a cloud application 106 receiving performance data from a UE 104 that is connected to a wireless network 100. As shown in FIG. 2 at 202, performance statistics are generated by traditional PM counters. The first set of performance data may be performance data that is associated with a triggering event, and may include a plurality of parameters associated with the UE connectivity to the RAN 100. For example, the first set of performance data may include (i) radio accessibility/retain ability/bearer establishment success rate per device type, (ii) number of simultaneous users for a predefined measurement period, (iii) control channel utilization rate, (iv) user timing advance distribution for the cell, (v) number of noise-bandwidth ratio relations, (vi) noise-band-width mobility success rate, (vii) band utilization percentage, (viii) effective cell throughput per band, Average Channel Quality indicator reported in cell level, (ix) specific portion of the spectrum utilization per cell, (x) uplink reported Received Signal Strength Indicator and measured SINR/interference level in resource band granularity, (xi) number of users scheduled per transmission time interval, and (xii) call admission control congestion rate. As shown in FIG. 2 at 204, a UE experiencing a performance issue may be the triggering event. The UE may be connected to the RAN network 100 by a SIM or through a subscription, as seen in 206. In some implementations, the UE may be equipped with a built-in user equipment application. In other implementations, the UE may not be equipped with a built-in user equipment application.

In some implementations, the first set of performance data may include memory data specific to the UE 104. For example, the first set of performance data may include data indicating the level of available memory for the UE 104, whether the UE 104 is connected to a power source, whether the customer device 104 is connected to a Wi-Fi network, or whether the UE 104 is connected to the wireless network 100, or any other suitable performance data associated with the UE 104.

A UE may be a customer electronic device, for example a cellular phone, or any other suitable electronic device. A triggering event is an event that occurs when the customer experiences an issue with their wireless service. For example, as illustrated at 216, a triggering event may include a dropped voice call, a dropped video call, no network connectivity, uploading time exceeding an uploading threshold time, or a downloading time exceeding a downloading threshold time. In some implementations, a triggering event may include any event where a UE 104 does not meet one or more predefined performance metrics. In other examples, a triggering event can include a successful data call with voice call establishment failure, SMS or MMS failure, unable to enable Wi-Fi personal hotspot while utilizing cellular network, radio signal fluctuation at UE receiver, or quick battery drain.

When a triggering event occurs, a user equipment application that is deployed on the UE 104 is prompted to communicate performance data to the one or more processing devices of the cloud application 106. The UE 104 may communicate near real-time data gathered at or about the time of the triggering event, as well as non-real time data, which may have been gathered before and or after the triggering event. The performance data associated with the connectivity of the UE may be stored in a buffer that is refreshed periodically until a performance issue, such as a triggering event occurs. In response to the triggering event occurring, the data in the buffer is moved to a second permanent memory location for analysis. For example, in response to a triggering event occurring, performance data from the time of the event and for fifteen minutes before and after the triggering event may be stored in a second permanent memory location, as seen at 202.

In some implementations, the length of the period of time before and after the triggering event which is moved to a second location changes based on the type of triggering event that occurred. For example, when a customer experiences a dropped voice call, the performance data associated with the UE 104 which may be moved to a second permanent memory location may include the performance data from the time of the dropped voice call, and the performance data from ten minutes before and after the dropped call. In some implementations, the performance data associated with the connectivity of the UE 104 may be stored in temporary memory buffer at the UE, and in other implementations, the performance data associated with the connectivity of the UE 104 may be stored in a temporary memory buffer at the cloud application 106. In some implementations, the second permanent memory location may be a memory location at the cloud application 106.

The process 300 may include receiving from one or more network components within the RAN, a second set of performance data associated with the triggering event (304). For example, as illustrated in FIG. 2 at 212 and 214, this may correspond to the one or more processing devices at the cloud application 106 receiving performance data from one or more distributed units (DU) located throughout the network 100. The one or more processing devices at the cloud application 106 may receive performance data from a centralized unit (CU) and a radio unit (RU) which are both connected to the DU through an open interface. The second set of performance data may also include network strength data. The network strength data may reflect the connectivity strength of the one or more DUs, CUs, and RUs throughout the network 100.

The process 300 may include identifying a root cause for the triggering event based on the first and second sets of performance data (306). For example, the one or more processing devices at the cloud application 106 may process the first set of performance data received from the UE 104 and the second set of performance data received from the one or more components of the network 100. The one or more processing devices at the cloud application 106 may identify a cause for the triggering event based on processing the first and second sets of performance data. The one or more processing devices at the cloud application 106 may use different data processing techniques to process the first set and second sets of performance data. The one or more processing devices at the cloud application 106 may be configured to identify whether the cause of the triggering event was a network problem or a UE problem. For example, the one or more processing devices at the cloud application 106 may identify that a user equipment specific problem is the cause for the triggering event.

The process 300 may include identifying an action to be performed by the UE to address the root cause (308). For example, the one or more processing devices at the cloud application 106 may identify a first action to be performed when the one or more processing devices at the cloud application 106 determine that a user equipment problem is the root cause of the triggering event. In some implementations, the one or more processing devices at the cloud application 106 may identify a specific action to be taken based on identifying the specific type of user equipment problem, for example, as illustrated in FIG. 2 at 208 and 224. In some implementations, when the one or more processing devices at the cloud application 106 identify a problem of establishment failure, the identified action may be to monitor the voice call attempt UL carrier noise level for interference on the assigned physical resource block.

The process may include transmitting a signal configured to instruct an application on the UE to perform the action to address the identified root cause (310). For example, when the one or more processing devices at the cloud application 106 determine that a user equipment problem is the root cause of the triggering event, the one or more processing devices transmit a signal to instruct the user equipment application on the UE 104 to adjust one or more settings on the UE 104 to rectify the issue. For example, the cloud application 106 may transmit a signal instructing the user equipment application to move to a different roaming partner when there is transport congestion observed/identified on the current serving network at any observed instant to improve user experience whenever possible.

In some implementations, the one or more processing devices at the cloud application 106 may determine that the identified root cause for the triggering event is a network issue. For example, the one or more processing devices at the cloud application 106 may determine that the customer device 104 is connected to a network component which is in an alarm state. The network component may be in an alarm state when the network component is saturated, or the connectivity of the network component is below a threshold connectivity. Based on determining that the network component is an alarm state, the one or more processing devices at the cloud application 106 may identify a second network that is available in the customer's location, and may communicate instructions to the user equipment application on the customer device 104 to switch to the available second network. In some implementations, the second network may be a wireless network that is managed and maintained by a second wireless provider. In these implementations, the second network may be considered a roaming network, for example, as illustrated in FIG. 2 at 218. In other implementations, the second network may be a wireless network that is managed by the same entity.

In some implementations, the one or more processing devices at the cloud application 106 may not be able to determine the root cause of the triggering event based on the first set and second sets of performance. In these implementations, the cloud application 106 escalates the issue to an application server 108 in communication with the cloud application 106. As illustrated in FIG. 2, at 222 the application server 108 is equivalent to the analytic app for the RAN network. In more detail, the one or more processing devices at the cloud application 106 may communicate the first and second sets of performance data to the application server 108 for the application server 108 to attempt to identify the root cause of the triggering event. The one or more processing devices at the application server 108 may request additional performance data from the one or more network components within the wireless network 100, for example, as illustrated in FIG. 2 at 210, 212, and 214. In response to the request for additional performance data, the one or more processing devices at the application server 108 may receive a third set of performance data from one or more additional components in the network 100. For example, the one or more processing devices at the application server 108 may receive performance data from one or more additional network components, that is, from the one or more network components that may not have provided performance data in the second set of data. In some implementations, the one or more processing devices at the application server 108 may receive additional performance data from the one or more network components.

The one or more processing devices at the application server 108 may utilize received performance data to generate a machine learning model that is trained to determine a root cause of a triggering event. The machine learning model may be trained based on network performance data received from a plurality of user devices within the network 100 and from a plurality of network components. In some implementations, the machine learning model may be trained on network performance data received from a plurality of networks. The machine learning model may be trained to identify performance issues and the causes of said performance issues.

In some implementations, the machine learning model can be trained via a supervised learning process using a large corpus of training performance data. The one or more processing devices at the application server 108 may use performance data received from a plurality of UEs 104 within the network 100 and from a plurality of network components to continuously update and retrain the machine learning model on a periodic basis. The one or more processing devices at the application server 108 access the machine learning model and determine, based on an output of the machine learning model, a root cause for the triggering event. The one or more processing devices at the application server 108 may then generate a signal configured to trigger a remedial action. For example, the one or more processing devices at the application server 108 may determine that the root cause for a triggering event is a damaged radio unit. The application server 108 may identify another radio unit within the network that is functioning optimally, and may generate a signal configured to communicate with the user equipment application instruct the UE 104 to switch connectivity from the damaged radio unit to the optimally functioning radio unit. In another example, the one or more processing devices at the application server 108 may determine that a network component is in an alarm state, and may generate a signal configured to communicate with the network component instructing the network component to reallocate resources. For example, as illustrated in FIG. 2 at 220, and 228, the roaming partner is identified. The network component may receive the instructions from the one or more processing devices at the application server 108 and may reallocate one or more resources to take the network component out of the alarm state, for example, as illustrated in FIG. 2. at 220.

Figure 4:
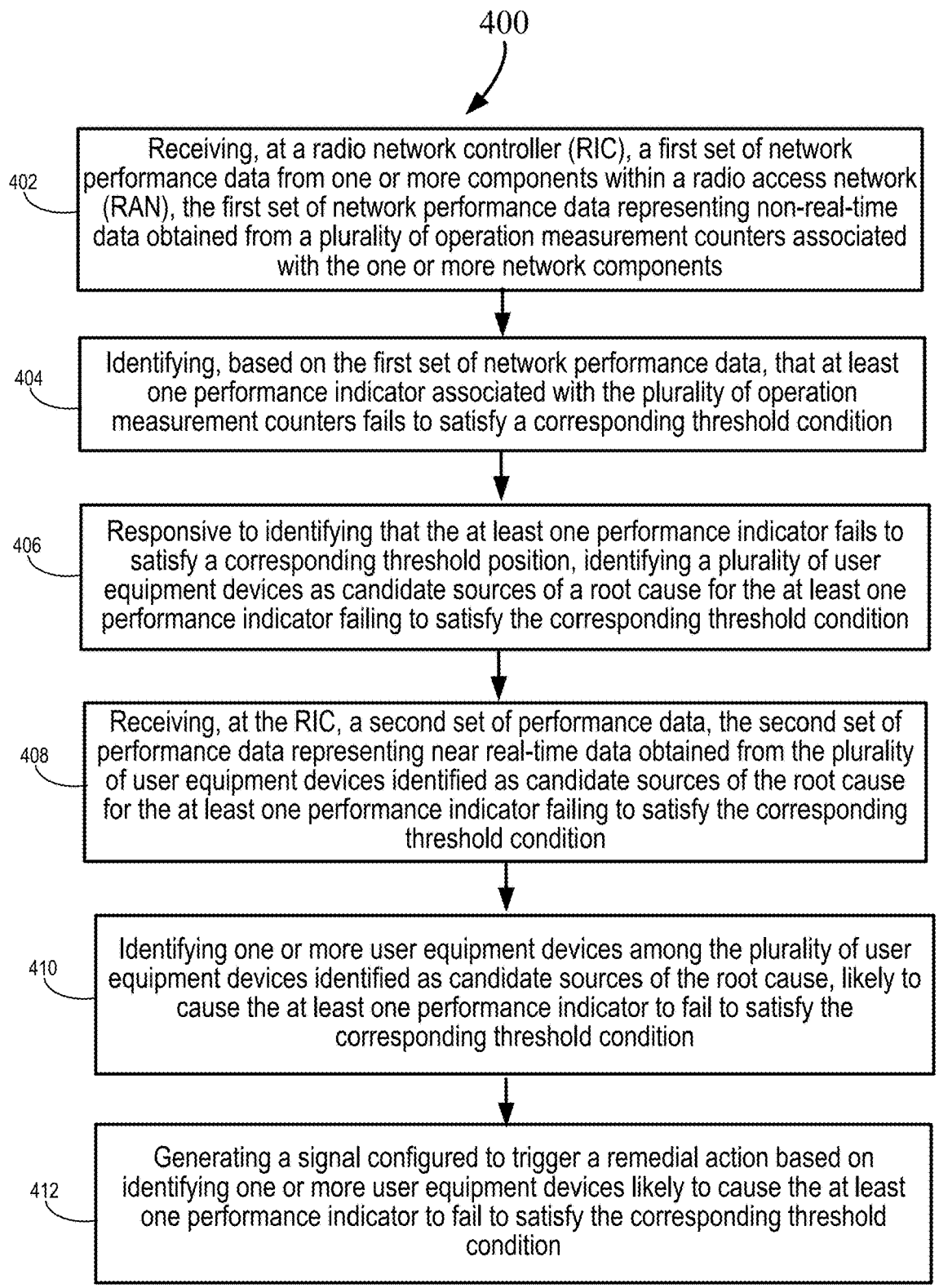
FIG. 4 is a flowchart of a process for resolving performance issues in a RAN, based on identifying one or more UEs likely responsible for the performance issues.

FIG. 4 illustrates exemplary process 400 for generating a signal configured to trigger a remedial action based on identifying one or more UEs 104 likely to cause the at least one performance indicator to fail to satisfy the corresponding threshold condition. The following describes the process 400 as being performed by components of the system 100 described above with reference to FIGS. 1A and 1B. However, the process 400 may be performed by other systems and configurations. Briefly, the process 400 may include receiving, at a radio access network (RAN) intelligent controller (RIC), a first set of network performance data from one or more components within a radio access network (RAN), the first set of network performance data representing non-real-time data obtained from a plurality of operation measurement counters associated with the one or more network components (402), identifying, by one or more processing devices, based on the first set of network performance data, that at least one performance indicator associated with the plurality of operation measurement counters fails to satisfy a corresponding threshold condition (404), responsive to identifying that the at least one performance indicator fails to satisfy a corresponding threshold condition, identifying a plurality of user equipment devices as candidate sources of a root cause for the at least one performance indicator failing to satisfy the corresponding threshold condition (406), receiving, at the RIC, a second set of performance data, the second set of performance data representing near real-time data obtained from the plurality of user equipment devices identified as candidate sources of the root cause for the at least one performance indicator failing to satisfy the corresponding threshold condition (408), identifying, by the one or more processing devices, one or more user equipment devices, among the plurality of user equipment devices identified as candidate sources of the root cause, likely to cause the at least one performance indicator to fail to satisfy the corresponding threshold condition (410), and based on identifying one or more user equipment devices likely to cause the at least one performance indicator to fail to satisfy the corresponding threshold condition, generating, by one or more processing devices, a signal configured to trigger a remedial action (412).

In more detail, process 400 may include receiving, at a radio access network (RAN) intelligent controller (RIC), a first set of network performance data from one or more components within a radio access network (RAN), the first set of network performance data representing non-real-time data obtained from a plurality of operation measurement counters associated with the one or more network components (402). For example, this may correspond to a RIC component 114 of a cloud application 106 continuously receiving network performance data from the one or more network components within the RAN network 100. The system may continuously monitor the performance of the network by receiving the network performance data from the one or more network components within the RAN network 100 on a continuous basis. In some implementations, the network performance data is received at the RIC 114 may be received on a periodic basis. For example, the network performance data may be received ever fifteen minutes as an aggregate, or ever minute over a period of fifteen minutes. In some examples, the network performance data may be received at the RIC 114 at any suitable time period. For example, as illustrated in FIG. 2 at 202, the network performance data includes a plurality of operation measurement counters associated with each of the one or more network components. Each of the plurality of operations measurement counters evaluate a performance metric associated with the performance of the one or more components of the network 100. The plurality of operations measurement counters may include (i) Random Access Channel (RACH) related Counters (attempts, zero-crossing channel condition (ZCZC), root Sequence, RACH Location, RACH Tx Power), (ii) Uplink (UL) Transmit Power Shortage (Power Headroom), (iii) Radio Resource Control (RRC) Reestablishment (attempts, Failures specific to cell level), (iv) 5QI Establishment Success rate, (v) Past and Current Month Similar type User Subscription Comparison, (vi) Measurement Report with Neighbor & Serving Cell PCI information, (vii) UL Received Signal Strength Indicator (RSSI) statistics, (viii) Resource block (RB) Assignments, Average channel quality indicator (CQI), Layer Indicator, (ix) Mobility Event triggers and associated/related cell information.

The process 400 may include identifying, by one or more processing devices, based on the first set of network performance data, that at least one performance indicator associated with the plurality of operation measurement counters fails to satisfy a corresponding threshold condition (404). For example, this may correspond to the one or more processing devices at the cloud application 106 identifying when a performance indicator is not being met. The one or more processing devices at the cloud application 106 may process the received network performance data by comparing the one or more operation measurement counters associated with the one or more network components to one or more thresholds. Each of the one or more thresholds may represent optimal operation parameters for the one or more network components. When an operation measurement counter for a network component does not meet a corresponding threshold, the one or more processing devices at the cloud application 106 flags the network component and identifies the operation measurement counter that does not meet the threshold.

The process 400 may include identifying a plurality of user equipment devices as candidate sources of a root cause for the at least one performance indicator failing to satisfy the corresponding threshold condition responsive to identifying that the at least one performance indicator fails to satisfy a corresponding threshold condition (406). For example, this may correspond to the one or more processing devices at cloud application 106 identifying a plurality of potential UEs that are being faced with performance issues.

The process 400 may include receiving, at the RIC, a second set of performance data, the second set of performance data representing near real-time data obtained from the plurality of user equipment devices identified as candidate sources of the root cause for the at least one performance indicator failing to satisfy the corresponding threshold condition (408). For example, this may correspond to the RIC component 114 of a cloud application 106 receiving near real-time network performance data from the plurality of UEs 104 identified as candidate sources of the root cause for the at least one performance indicator failing to satisfy the corresponding threshold condition. As described above, with reference to FIG. 1B, the RIC 114 is configured to perform non-real-time analysis and near-real-time analysis of network traffic and performance. The RIC 114 receives the near-real time data from a subset of the user equipment devices 104 that are serviced by the RAN network 100. By limiting the near-real time data that is received and processed to the subset of UEs 104, the process becomes time and resource efficient, that is, the cloud application 106 is not tasked with processing performance data for each of the UEs 104 within the network 100.

The process 400 may include identifying, by the one or more processing devices, one or more user equipment devices, among the plurality of user equipment devices identified as candidate sources of the root cause, likely to cause the at least one performance indicator to fail to satisfy the corresponding threshold condition (410). For example, this may correspond to the one or more processing devices at the cloud application 106 processing the second set of performance data to identify which of the UE 104 caused at least indicator to fail to satisfy the threshold.

The process 400 may include generating, by one or more processing devices, a signal configured to trigger a remedial action based on identifying one or more user equipment devices likely to cause the at least one performance indicator to fail to satisfy the corresponding threshold condition (412). For example, this may correspond to the one or more processing devices at the cloud application 106 communicating with a user equipment application on the identified user equipment 104. In some examples, the one or more processing devices at the cloud application 106 may communicate a signal to the identified UE 104 instructing the UE 104 to reduce a number of multiple input multiple output (MIMO) layers utilized to cause a reduction in heat levels produced from a battery of the UE 104.

In some implementations, generating a signal configured to trigger a remedial action includes identifying a sector of the RAN 100 that does not have current performance issues, and generating a signal instructing at least one UE 104 to switch over to the sector of the RAN 100 that does not have performance issues. In some implementations, generating a signal configured to trigger a remedial action may include generating a signal to the plurality of candidate user equipment 104 to change a hand over value for at least one UE 104 in the subset of UEs 104.

Figure 5:
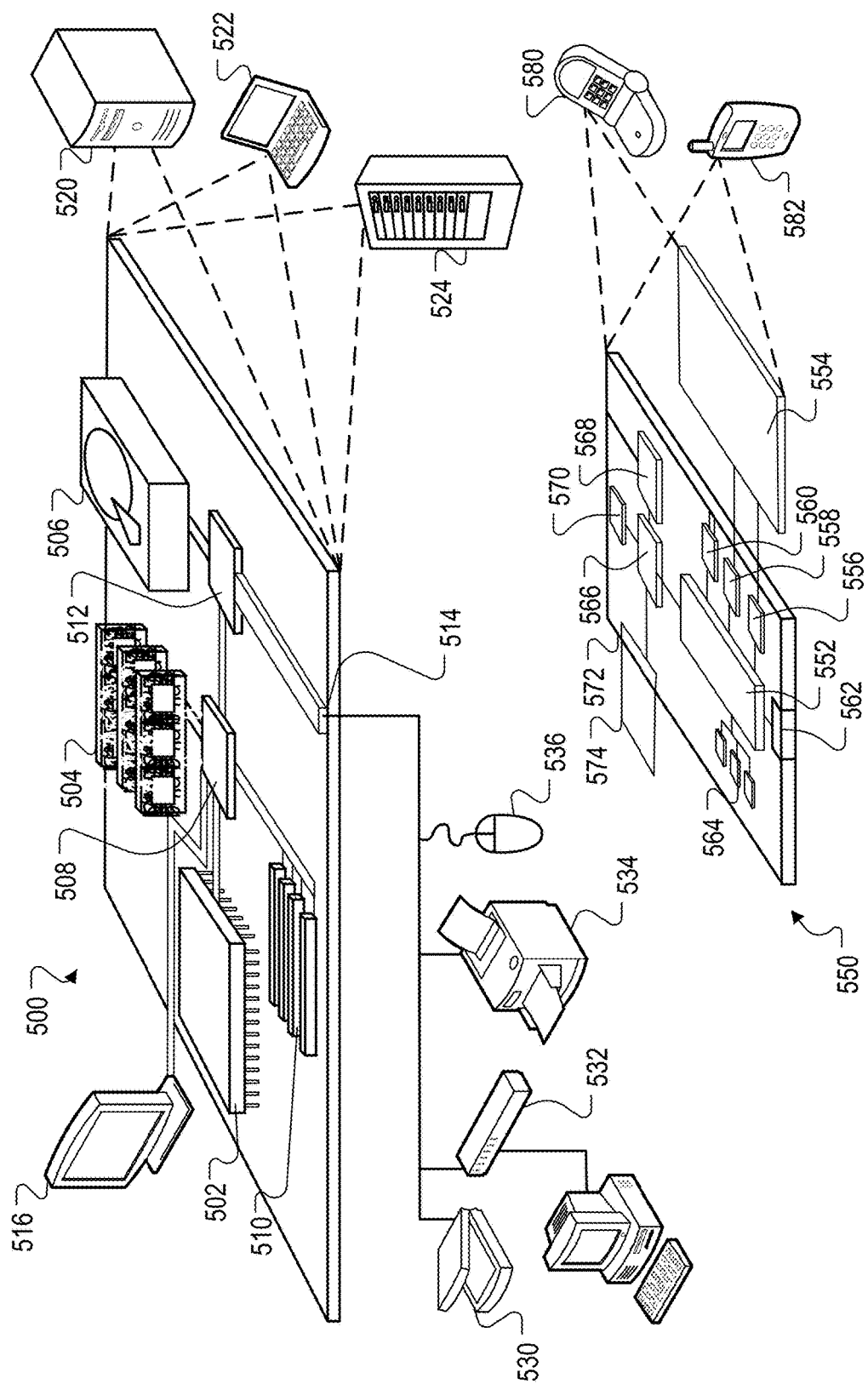
FIG. 5 is a diagram illustrating an example of a computing device usable for implementing at least portions of technology described herein.

FIG. 5 shows an example of a computing device 500 and a mobile computing device 550 that can be employed to execute implementations of the present disclosure. For example, the RAN entities described above can be part of a 5G Open RAN (O-RAN) architecture deployed in a cloud computing environment, and computing devices 500 (and/or mobile devices 550) may be used to implement various portions of such a cloud computing environment.

The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting. The computing device 500 and/or the mobile computing device 550 can be user devices that form at least a portion of a system that runs one or more software applications to implement the technology described herein. The computing device 500 and/or the mobile computing device 550 can also be used to perform the process 200 described and shown above in relation to FIG. 1.

The computing device 500 includes a processor 502, a memory 505, a storage device 506, a high-speed interface 508, and a low-speed interface 512. In some implementations, the high-speed interface 508 connects to the memory 504 and multiple high-speed expansion ports 510. In some implementations, the low-speed interface 512 connects to a low-speed expansion port 514 and the storage device 504. Each of the processor 502, the memory 504, the storage device 506, the high-speed interface 508, the high-speed expansion ports 510, and the low-speed interface 512, are interconnected using various buses, and may be mounted on a common motherboard or in other manners as appropriate. The processor 502 can process instructions for execution within the computing device 500, including instructions stored in the memory 504 and/or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory.

The memory 504 stores information within the computing device 500. In some implementations, the memory 504 is a volatile memory unit or units. In some implementations, the memory 504 is a non-volatile memory unit or units. The memory 504 may also be another form of a computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 502, perform one or more methods, such as those described above. The instructions can also be stored by one or more storage devices, such as computer-readable or machine-readable mediums, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 503 and the low-speed expansion port 514. The low-speed expansion port 514, which may include various communication ports (e.g., Universal Serial Bus (USB), Bluetooth, Ethernet, wireless Ethernet) may be coupled to one or more input/output devices. The input/output devices may also be coupled to the low-speed expansion port 514 through a network adapter. Such network input/output devices may include, for example, a switch or router.

The computing device 500 may be implemented in a number of different forms, as shown in FIG. 5. For example, it may be implemented as a standard server 520, or multiple times in a group of such servers. In addition, it may be implemented in a personal computer such as a laptop computer 522. It may also be implemented as part of a rack server system 524.

In some implementations, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552; a memory 534; an input/output device, such as a display 554; a communication interface 533; and a transceiver 538; among other components. The mobile computing device 550 may also be provided with a storage device, such as a micro-drive or other device, to provide additional storage. Each of the processor 552, the memory 534, the display 555, the communication interface 533, and the transceiver 538, are interconnected using various buses, and several of the components may be mounted on a common motherboard or in other manners as appropriate.

The processor 552 may communicate with a user through a control interface 558 and a display interface 553 coupled to the display 554. The display 554 may be, for example, a Thin-Film-Transistor Liquid Crystal Display (TFT) display, an Organic Light Emitting Diode (OLED) display, or other appropriate display technology. The display interface 553 may include appropriate circuitry for driving the display 554 to present graphical and other information to a user. The control interface 558 may receive commands from a user and convert them for submission to the processor 552. In addition, an external interface 532 may provide communication with the processor 552, so as to enable near area communication of the mobile computing device 550 with other devices. The external interface 532 may provide, for example, for wired communication in some implementations, or for wireless communication in other implementations, and multiple interfaces may also be used.

The memory 534 stores information within the mobile computing device 550. The memory 534 can be implemented as one or more of a computer-readable medium or media, a volatile memory unit or units, or a non-volatile memory unit or units. An expansion memory 574 may also be provided and connected to the mobile computing device 550 through an expansion interface 572. The expansion memory 574 may provide extra storage space for the mobile computing device 550, or may also store applications or other information for the mobile computing device 550. Specifically, the expansion memory 574 may include instructions to carry out or supplement the processes described above, and may include secure information also.

The memory may include, for example, flash memory and/or non-volatile random access memory (NVRAM), as discussed below. In some implementations, instructions are stored in an information carrier. The instructions, when executed by one or more processing devices, such as processor 552, perform one or more methods, such as those described above. The instructions can also be stored by one or more storage devices, such as one or more computer-readable or machine-readable mediums, such as the memory 534, the expansion memory 574, or memory on the processor 552. In some implementations, the instructions can be received in a propagated signal, such as, over the transceiver 538 or the external interface 532.

The mobile computing device 550 may communicate wirelessly through the communication interface 533, which may include digital signal processing circuitry where necessary. The communication interface 533 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 538 using a radio frequency. In addition, short-range communication, such as using a Bluetooth or Wi-Fi, may occur. In addition, a Global Positioning System (GPS) receiver module 570 may provide additional navigation- and location-related wireless data to the mobile computing device 550, which may be used as appropriate by applications running on the mobile computing device 550.

The mobile computing device 550 may also communicate audibly using an audio codec 530, which may receive spoken information from a user and convert it to usable digital information. The audio codec 530 may likewise generate audible sound for a user, such as through a speaker, e.g., in a handset of the mobile computing device 550.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program can be written in any form of programming language, including compiled or interpreted languages, or declarative or procedural languages; and it can be deployed on a system of one or more computers in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment.

Conversely, various features that are described in the context of a single embodiment can also be implemented in multiple embodiments separately or in any suitable sub-combination. Moreover, although features may be described above as acting in certain combinations and even initially be claimed as such, one or more features from a claimed combination can in some cases be excised from the combination, and the claim may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

receiving, at a radio access network (RAN) intelligent controller (RIC), a first set of network performance data from one or more network components within a radio access network (RAN), the first set of network performance data representing non-real-time data obtained from a plurality of operation measurement counters associated with the one or more network components;

identifying, by one or more processing devices, based on the first set of network performance data, that at least one performance indicator associated with the plurality of operation measurement counters fails to satisfy a corresponding threshold condition;

responsive to identifying that the at least one performance indicator fails to satisfy a corresponding threshold condition, identifying a plurality of user equipment devices as candidate sources of a root cause for the at least one performance indicator failing to satisfy the corresponding threshold condition;

receiving, at the RIC, a second set of performance data, the second set of performance data representing near real-time data obtained from the plurality of user equipment devices identified as candidate sources of the root cause for the at least one performance indicator failing to satisfy the corresponding threshold condition;

identifying, by the one or more processing devices, one or more user equipment devices, among the plurality of user equipment devices identified as candidate sources of the root cause, likely to cause the at least one performance indicator to fail to satisfy the corresponding threshold condition; and based on identifying one or more user equipment devices likely to cause the at least one performance indicator to fail to satisfy the corresponding threshold condition, generating, by one or more processing devices, a signal configured to trigger a remedial action.

2. The method of claim 1, wherein generating, by the one or more processing devices, a signal configured to trigger a remedial action comprises, generating a signal to a user equipment device instructing the user equipment device to reduce a number of multiple input multiple output (MIMO) layers utilized to cause a reduction in heat levels produced from a battery of the user equipment device.

3. The method of claim 1, wherein generating, by the one or more processing devices, a signal configured to trigger a remedial action comprises, generating a signal to the plurality of candidate user equipment devices to change a trigger value for at least one user equipment device in the subset of user equipment devices.

4. The method of claim 1, wherein generating, by the one or more processing devices, a signal configured to trigger a remedial action comprises, generating a signal to the plurality of candidate user equipment to change a hand over value for at least one user equipment device in the subset of user equipment devices.

5. The method of claim 1, wherein generating, by the one or more processing devices, a signal configured to trigger a remedial action comprises:
identifying a sector of the RAN that does not have current performance issues; and
generating a signal instructing at least one user equipment device move to the sector of the RAN that does not have performance issues.

6. The method of claim 1, wherein the first set of performance data is processed by a non-real-time RIC, and the second set of performance data is processed by a near real-time RIC.

7. The method of claim 1, wherein receiving, at a radio access network (RAN) intelligent controller (RIC), a first set of network performance data from one or more network components within a radio access network (RAN), the first set of network performance data representing non-real-time data obtained from a plurality of operation measurement counters associated with the one or more network components, comprises receiving random access channel related counter data, past and current month user subscription comparison data, uplink received signal strength indicator statistics, and resource block assignments data.

8. A system comprising:
one or more computers and one or more storage devices on which are stored instructions that are operable, when executed by the one or more computers, to cause the one or more computers to perform operations comprising:
receiving, at a radio access network (RAN) intelligent controller (RIC), a first set of network performance data from one or more network components within a radio access network (RAN), the first set of network performance data representing non-real-time data obtained from a plurality of operation measurement counters associated with the one or more network components;
identifying, by one or more processing devices, based on the first set of network performance data, that at least one performance indicator associated with the plurality of operation measurement counters fails to satisfy a corresponding threshold condition;
responsive to identifying that the at least one performance indicator fails to satisfy a corresponding threshold condition, identifying a plurality of user equipment devices as candidate sources of a root cause for the at least one performance indicator failing to satisfy the corresponding threshold condition;
receiving, at the RIC, a second set of performance data, the second set of performance data representing near real-time data obtained from the plurality of user equipment devices identified as candidate sources of the root cause for the at least one performance indicator failing to satisfy the corresponding threshold condition;
identifying, by the one or more processing devices, one or more user equipment devices, among the plurality of user equipment devices identified as candidate sources of the root cause, likely to cause the at least one performance indicator to fail to satisfy the corresponding threshold condition; and
based on identifying one or more user equipment devices likely to cause the at least one performance indicator to fail to satisfy the corresponding threshold condition, generating, by one or more processing devices, a signal configured to trigger a remedial action.

9. The system of claim 8, wherein generating, by the one or more processing devices, a signal configured to trigger a remedial action comprises, generating a signal to a user equipment device instructing the user equipment device to reduce a number of multiple input multiple output (MIMO) layers utilized to cause a reduction in heat levels produced from a battery of the user equipment device.

10. The system of claim 8, wherein generating, by the one or more processing devices, a signal configured to trigger a remedial action comprises, generating a signal to the plurality of candidate user equipment devices to change a trigger value for at least one user equipment device in the subset of user equipment devices.

11. The system of claim 8, wherein generating, by the one or more processing devices, a signal configured to trigger a remedial action comprises, generating a signal to the plurality of candidate user equipment to change a hand over value for at least one user equipment device in the subset of user equipment devices.

12. The system of claim 8, wherein generating, by the one or more processing devices, a signal configured to trigger a remedial action comprises:
identifying a sector of the RAN that does not have current performance issues; and
generating a signal instructing at least one user equipment device move to the sector of the RAN that does not have performance issues.

13. The system of claim 8, wherein the first set of performance data is processed by a non-real-time RIC, and the second set of performance data is processed by a near real-time RIC.

14. The system of claim 8, wherein receiving, at a radio access network (RAN) intelligent controller (RIC), a first set of network performance data from one or more network components within a radio access network (RAN), the first set of network performance data representing non-real-time data obtained from a plurality of operation measurement counters associated with the one or more network components, comprises receiving random access channel related counter data, past and current month user subscription comparison data, uplink received signal strength indicator statistics, and resource block assignments data.

15. One or more non-transitory computer storage media encoded with computer program instructions that when executed by one or more computers cause the one or more computers to perform operations comprising:
receiving, at a radio access network (RAN) intelligent controller (RIC), a first set of network performance data from one or more network components within a radio access network (RAN), the first set of network performance data representing non-real-time data obtained from a plurality of operation measurement counters associated with the one or more network components;
identifying, by one or more processing devices, based on the first set of network performance data, that at least one performance indicator associated with the plurality of operation measurement counters fails to satisfy a corresponding threshold condition;
responsive to identifying that the at least one performance indicator fails to satisfy a corresponding threshold condition, identifying a plurality of user equipment devices as candidate sources of a root cause for the at least one performance indicator failing to satisfy the corresponding threshold condition;

receiving, at the RIC, a second set of performance data, the second set of performance data representing near real-time data obtained from the plurality of user equipment devices identified as candidate sources of the root cause for the at least one performance indicator failing to satisfy the corresponding threshold condition;

identifying, by the one or more processing devices, one or more user equipment devices, among the plurality of user equipment devices identified as candidate sources of the root cause, likely to cause the at least one performance indicator to fail to satisfy the corresponding threshold condition; and based on identifying one or more user equipment devices likely to cause the at least one performance indicator to fail to satisfy the corresponding threshold condition, generating, by one or more processing devices, a signal configured to trigger a remedial action.

* * * * *